Patented Oct. 12, 1954

UNITED STATES PATENT OFFICE 2,691,598

POROUS MATERIALS SUITABLE FOR USE AS THERMAL AND ACOUSTIC INSULATORS AND PROCESS FOR THEIR MANUFACTURE

Charles Meurice, Brussels, and Fernand Parentani, Rixensart, Belgium, assignors to Bureau d'Etudes et Laboratoires Annexes a l'Institut Meurice Chimie S. P. R. L., Brussels, Belgium, a Belgian company No Drawing. Application March 22, 1951,
Serial No. 217,052

Claims priority, application Belgium
March 30, 1950

2 Claims. (Cl. 106—40)

It is known to use for the manufacture of building materials having a high resistance to crushing, very fine ashes called "flying ashes" which come from the combustion of pulverized coal. To that end these ashes are mixed and kneaded with lime and water, the mixture hardened by heat acquiring a resistance to crushing which exceeds 500 kgs. per square centimeter.

The present invention is based on observation of the fact that the ashes from the combustion of some pulverized coals contain more or less large quantities of spherular ashes, i. e. ashes formed of very tiny hollow spheres of vitrified material. Such spherular ashes are not suitable, as such, for the manufacture of high mechanical resistance materials, and, when they are present, they are usually crushed in the course of kneading with lime and water.

We have found that the great lightness of the hollow spherular ashes, which is of the order of 0.3 to 0.9 apparent density, makes it possible to separate them from the still finer ashes of solid nature and higher density, and that by incorporating them in a binder without breaking them, materials are obtained whose insulating properties are surprising, both from the thermal and the acoustic point of view. The process according to this invention therefore consists broadly in using spherular ashes for making light, porous material, suitable for use as thermal and acoustic insulators. The spherular ashes must previously be separated from the accompanying finer solid ashes accompanying them; any suitable process such as washing, screening or electrostatic precipitation may be used for such separation.

In order to obtain light insulating building materials, we may use very different binders, e. g. when working in the cold, plaster which is suitable, for example, for the lagging or covering of heating and steam pipes. Use can also be made of very different kinds of mineral and organic binders, such as molasses, flour, dextrin, bentonite, kaolin and clays; these binders may also be used together.

The hollow spherules may, if required, be sorted into different categories for the purpose of obtaining products of definite densities. There are then used separating liquids of different densities or streams of liquid at suitable speeds.

According to one embodiment of the invention, the hollow spherular ashes are employed for the manufacture of bricks or other ceramic articles. In this case, it is advisable to subject the spherules to a preliminary heating or firing. There is thus produced a change in the material which particularly causes any stresses existing in the small spheres to disappear. This heating or firing may be carried out at about 400 to 800° C., giving only a small amount of waste due to the breaking of small spheres. After heating the spherules may undergo a further washing for the purpose of removing those of them that are broken. They can then be mixed with the binder and, after moulding, the product can be subjected to firing.

By way of example, bricks may be obtained as follows:

To 90 parts by weight of calcined and cooled spherules there are added 9 parts of kaolin and 1 part of bentonite. 2% of molasses and 20 to 45 parts of water are then added and the mixture is moulded. The bricks are dried and may be calcined, without any special precautions, at a temperature of 900 to 1200° C. The bricks thus obtained are very light, their apparent density being of the order of 0.4 to 0.5 in many cases. Lower densities may be obtained by the addition of wood charcoal, coal dust, coke, sawdust or other materials which are eliminated, at least partially in the firing operation. By carrying out the firing at a higher temperature (1280° C. for example), products are obtained having a slightly lower apparent density but a great resistance to crushing.

It has also been found that the spherules may replace kieselguhr in various uses, especially as a filtering and absorbent material.

We claim:

1. In an insulation material formed of a mixture of a porous low density filler and a binder therefor that improvement consisting of hollow spherular ash particles which have been separated from fly ash, in admixture with said binder, the spherular particles having an apparent density of about 0.3 to about 0.9, the hollow spherular nature of said particles being maintained intact.

2. A method of insulation comprising covering the body to be insulated with a porous low density insulation material formed of hollow spherular ash particles which have been separated from fly ash, in admixture with a binder, the spherular particles having an apparent density of about 0.3 to about 0.9 and the hollow spherular nature of said particles being intact.

References Cited in the file of this patent

UNITED STATES PATENTS

| Number | Name | Date |
| --- | --- | --- |
| 1,682,675 | Horsfield | Aug. 28, 1928 |
| 1,823,928 | Bjorkman | Sept. 22, 1931 |
| 2,055,706 | Ramseyer | Sept. 29, 1936 |
| 2,136,096 | Benner et al. | Nov. 8, 1938 |
| 2,340,194 | McMullen | Jan. 25, 1944 |